United States Patent [19]

Henrick et al.

[11] 3,897,473

[45] July 29, 1975

[54] MERCAPTO AND SULFIDE CONTAINING DIENOIC THIOACID ESTERS

[75] Inventors: Clive A. Henrick; John B. Siddall, both of Palo Alto, Calif.

[73] Assignee: Zoecon Corporation, Palo Alto, Calif.

[22] Filed: Oct. 9, 1973

[21] Appl. No.: 404,634

Related U.S. Application Data

[60] Division of Ser. No. 256,605, May 24, 1972, Pat. No. 3,826,804, which is a continuation-in-part of Ser. No. 201,189, Nov. 22, 1971, abandoned, which is a continuation-in-part of Ser. No. 191,812, Oct. 22, 1971, abandoned.

[52] U.S. Cl. ............................................. 260/455 R
[51] Int. Cl.[2] ........................................ C07C 153/01

[58] Field of Search .................................. 260/455 R

[56] References Cited

UNITED STATES PATENTS

| | | | |
|---|---|---|---|
| 3,706,733 | 12/1972 | Henrick et al. ................ | 260/455 R |
| 3,732,282 | 5/1973 | Henrick et al. ................ | 260/455 R |
| 3,752,843 | 8/1973 | Henrick ........................ | 260/455 R |
| 3,755,411 | 8/1973 | Henrick et al. ................ | 260/455 R |

*Primary Examiner*—Lewis Gotts
*Assistant Examiner*—D. R. Phillips
*Attorney, Agent, or Firm*—Donald W. Erickson

[57] ABSTRACT

Aliphatic di-unsaturated esters and acids, and derivatives thereof, substituted with thiol (mercapto) or hydrocarbon thio group useful for the control of insects.

6 Claims, No Drawings

MERCAPTO AND SULFIDE CONTAINING DIENOIC THIOACID ESTERS

This is a division of application Ser. No. 256,605 filed May 24, 1972 now U.S. Pat. No. 3,826,804 which in turn is a continuation-in-part of application Ser. No. 201,189 filed Nov. 22, 1971 now abandoned, which in turn is a continuation-in-part of application Ser. No. 191,812 filed Oct. 22, 1971 now abandoned.

This invention relates to novel aliphatic diunsaturated esters and acids, derivatives thereof, intermediates therefor, substituted with thiol (mercapto) or a hydrocarbon thio group, syntheses thereof, and the control of insects. More particularly, the novel unsaturated esters and acids of the present invention are represented by the following formula A:

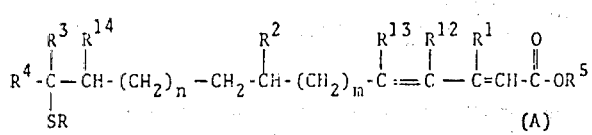

(A)

wherein,
each of $m$ and $n$ is zero or the positive integer one, two or three;
R is hydrogen, lower alkyl, cycloalkyl, aralkyl or aryl;
each of $R^1$ and $R^2$ is lower alkyl;
each of $R^3$, $R^{12}$, $R^{13}$ and $R^{14}$ is hydrogen or lower alkyl;
$R^4$ is alkyl; and
$R^5$ is hydrogen, lower alkyl, cycloalkyl, aryl, aralkyl, lower alkylthiaalkyl, lower alkoxyalkyl, halogen substituted lower alkyl, heterocyclic, lower alkenyl, lower alkynyl or a metal cation, and the acid halides thereof.

The compounds of formula A are useful for the control of insects. The utility of these compounds as insect control agents is believed to be attributable to their juvenile hormone activity. They are preferably applied to the immature insect, namely - during the embryo, larvae or pupae stage in view of their effect on metamorphosis and otherwise cause abnormal development leading to death or inability to reproduce. These compounds are effective control agents for Hemipteran such as Lygaeidae, Miridae and Pyrrhocoridae; Lepidopteran such as Pyralidae, Noctuidae and Gelechiidae; Coleopteran such as Tenebrionidae, Crysomelidae and Dermestidae; Dipteran such as mosquitos, flies; Homopteran such as aphids and other insects. The compounds can be applied at low dosage levels of the order of 0.01 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of formula A. Generally, a concentration of less than 25 percent of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of $m$, $n$, $R$–$R^5$ and $R^{12}$–$R^{14}$ is as defined hereinabove unless otherwise specified.

The compounds of formula A can be prepared according to the following outlined syntheses:

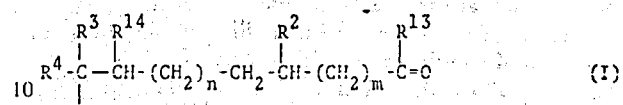

(I)

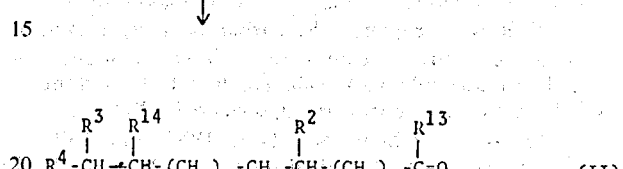

(II)

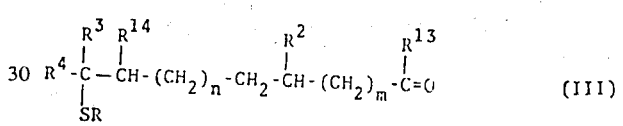

(III)

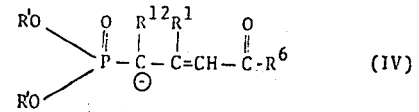

(IV)

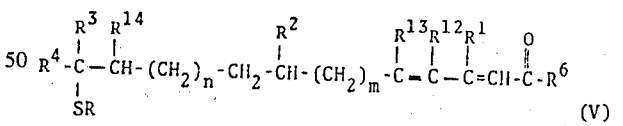

(V)

In the above formulas, X is bromo or chloro, R' is lower alkyl, cycloalkyl, benzyl or phenyl and $R^6$ is lower alkoxy, cycloalkoxy or aralkoxy.

In the above synthesis, a ketal or acetal of a carbonyl of formula I is converted into a thiol (mercapto) substituted ketal or acetal of the carbonyl of formula II. Preparation of the thiol can be accomplished for example, using thiourea followed by treatment with base, such as sodium hydroxide or an amine. Suitable methods applicable for preparation of thiols of formula II from a acetal or ketal of a compound of formula I are described by Cossar et al., J. Org. Chem 27, 93 (1962); Backer, Rec. trav. chim. 54, 215 (1935); Szmuszkovicz, Organic Preparations and Procedures 1 (1), 43-45 (1969); and Backer and Dijkstra Rec. trav. chim. 51, 290 (1932). A compound of formula II, or the acetal or ketal thereof, is then alkylated to prepare a thioether of formula III (R is not H). The alkylation can be accomplished using a halide of the hydrocarbon group desired such as lower alkyl iodide. The acetal or ketal protecting group is removed in a conventional manner using dilute acid such as aqueous hydrochloric acid, aqueous sulfuric acid, and the like. A carbonyl of formula III is then reacted with a carbanion of formula IV to prepare the dienoic ester of formula V (R is not hydrogen). Reaction of the carbanion with a carbonyl of formula II provides the mercapto compounds of formula V (R is hydrogen). The carbanion is generated from the respective phosphonate with a base such as alkali hydroxide, alkali alkoxide, alkali hydride, and the like. Suitable procedures are described by Pattenden and Weedon, J. Chem. Soc (C), 1984 and 1997 (1968), Corey et al., Tetrahedron Letters No. 2,1821 (1971) and U.S. Pat. Nos. 3,163,669 and 3,177,226.

A second synthesis of esters of formula V is outlined as follows:

and the like in organic solvent such as methanol or ethanol. Other esters of the present invention can be prepared by transesterification or conversion of the acid into the acid halide by treatment with thionyl chloride, oxalyl chloride, phosphorous pentabromide or the like, and then reacting the acid halide with the alcohol corresponding to the ester moiety desired.

In another embodiment of the present invention, there is provided thio-acids and thiol esters of formula VII. Thio-acids and thiol esters can be prepared from the respective acid halide using hydrogen sulfide to prepare the thio-acid and a thiol $R^{15}$-SH or a mercaptide to prepare the thiol ester. Thiol esters can be prepared by alkylation of the sodium salt of a thio-acid of the present invention also. See U.S. Pat. Nos. 3,567,747 and 3,505,366.

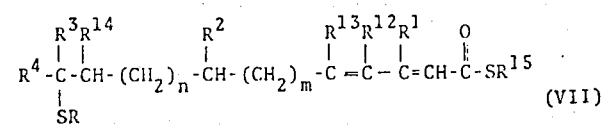

(VII)

wherein $R^{15}$ is hydrogen, lower alkyl, cycloalkyl, aryl or aralkyl.

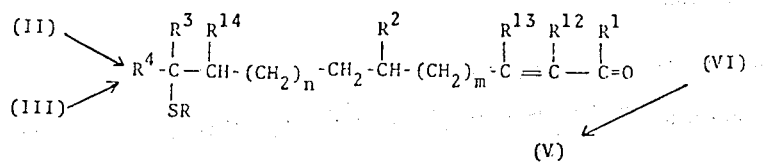

In the second synthesis outlined above of II and III to VI to V, a carbonyl of formula II or III is reacted with a carbanion of formula IV A using the conditions described above or with an ylid of formula IV B to yield an unsaturated ketone of formula VI.

The unsaturated ketone (VI) is then reacted with a carbanion of formula IVC to yield a compound of formula V or by Wittig reaction using the ylid (IVD).

Conversion of VI into V using carbanion (IVC) can be done using the same conditions as for conversion of III into V. Wittig reactions are generally done at higher temperatures such as from room temperature to reflux. The ylids are prepared from the corresponding phosphonium bromide or chloride by treatment with a base substance such as an alkali metal hydride, alkali metal hydroxide or alkali metal carbonate in an organic solvent, such as toluene, benzene, or tetrahydrofuran, or water or aqueous organic solvent depending upon the particular base. The Wittig reagents can be prepared as described in U.S. Pat. Nos. 3,193,565.

The esters of formula V are converted into the corresponding acid by hydrolysis with base such as potassium carbonate, sodium carbonate, sodium hydroxide, The compounds of formula I and the acetal; and ketals of can be prepared from a compound of formula I', the preparation of which is described in application Ser. No. 187,897, filed Oct. 8, 1971, now U.S. Pat. No. 3,755,411, the disclosure of which is incorporated by reference.

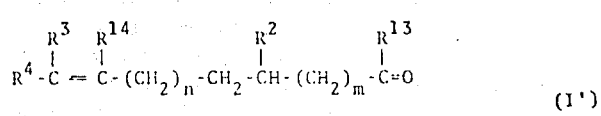

(I')

Reaction of an aldehyde of formula I with hydrogen chloride, acetyl chloride or hydrogen bromide in a lower monohydric alcohol solvent medium provides acetals of formula I. Ketals of formula I can be prepared by ketalization of a ketone of formula I using a lower alkylene glycol such as ethyleneglycol in the presence of an acid catalyst followed by chlorination or bromination. Suitable procedures applicable to the preparation of halides of formula I and acetals and ketals thereof are described in U.S. Pat. Nos. 2,902,510, 3,381,039, 3,428,694 and 3,584,010.

The term "lower alkyl" refers to an alkyl group having a chain length of one to six carbon atoms.

In addition to the compounds of the present invention having activity useful for the control of insects, the compounds have numerous other useful applications. For example, the esters of formula A of the present invention are useful lubricants and plasticizers for polymers such as SRB, polybutadiene, ethylene-propylene copolymers and polypropylene and aid in the processing and application of polymers. Thiolesters of formula VII possess excellent lubricating properties per se and are useful also as lubricant additives.

The presence of an olefinic bond at position C-2 and C-4 of the compounds of the present invention give rise to four isomers, each of which is embraced by the present invention. As mentioned above, a mixture of isomers is suitably employed for the control of insects such as a mixture containing the trans (2), trans (4) isomer and the cis (2), trans (4) isomer. The conditions of the syntheses described herein and the reactants can be selected so as to favor formation of one isomer such as the all trans isomer over the formation of other isomers. The selection of appropriate conditions and reactants to favor formation of one isomer over another will be apparent to those of ordinary skill in the art giving due consideration to the specific examples hereinafter. See also Pattenden and Weedon, supra and Corey et al., supra. In the specific examples hereinafter, when isomerism is not specified, it is understood to include a mixture of isomers which, if desired, can be separated using known separation methods. Hereafter, when only one designation of configuration is given, the designation refers to position C-2,3 and the configuration is taken to be trans at position C-4,5 when not otherwise specified.

The following examples are provided to illustrate the practice of the present invention. Temperature is given in degrees Centigrade.

EXAMPLE 1

Into a mixture of 10 g. of 3,7-dimethyloct-6-en-1-al and 100 ml. of dry methanol is introduced 1.1 equivalent of dry hydrogen chloride with cooling in ice-water. The mixture is then allowed to stand for about 24 hours at room temperature with stirring. Solvent is evaporated and residue taken up in ether which is washed with water, dried and evaporated under reduced pressure to give 1,1-dimethoxy-7-chloro-3,7-dimethyloctane.

The aldehydes under col. I are hydrochlorinated to give the respective compound under col. II.

I 3,7-dimethylnon-6-en-1-al
3-methyl-7-ethylnon-6-en-1-al
3-ethyl-7-methylnon-6-en-1-al
3,6,7-trimethyloct-6-en-1-al
3,6-dimethylhept-5-en-1-al
3,5,6-trimethylhept-5-en-1-al
2,5-dimethylhex-4-en-1-al
2,4,5-trimethylhex-4-en-1-al

II 1,1-dimethoxy-7-chloro-3,7-dimethylnonane
1,1-dimethoxy-7-chloro-3-methyl-7-ethylnonane
1,1-dimethoxy-7-chloro-3-ethyl-7-methylnonane
1,1-dimethoxy-7-chloro-3,6,7-trimethyloctane
1,1-dimethoxy-6-chloro-3,6-dimethylheptane
1,1-dimethoxy-6-chloro-3,5,6-trimethylheptane
1,1-dimethoxy-5-chloro-2,5 dimethylhexane
1,1-dimethoxy-5-chloro-2,4,5-trimethylhexane As an alternative method of preparation, there can be used the following procedure.

To 1.1 equivalents of acetyl chloride and 100 ml. of methanol, at about 10°, is added 10 g. of 3,7-dimethyloct-6-en-1-al. The reaction is allowed to stand for about 24 hours at 5°–10° and the allowed to rise to room temperature. After one hour, solvent is removed by evaporation and the concentrate taken up in ether, washed with water and brine, dried over magnesium sulfate and evaporated to yield 1,1-dimethoxy-7-chloro-3,7-dimethyloctane.

EXAMPLE 2

A mixture of 10 g. of 1,1-dimethoxy-7-chloro-3,7-dimethyloctane, one equivalent of thiourea and 100 ml. of 95% ethanol is refluxed for about 24 hours. Then a solution of 1.5 equivalents of sodium hydroxide in 50 ml. of water is added and the mixture refluxed for about two hours. After cooling to about room temperature, the solution is carefully acidified and ether is added. The organic layer is separated, washed with water, dried over calcium sulfate and evaporated to give 1,1-dimethoxy-7-mercapto-3,7-dimethyloctane which is purified by distillation.

EXAMPLE 3

To a mixture of 100 ml. of triethylene glycol and 42 g. of thiourea, at 75°–80°, is slowly added one equivalent of 1,1-dimethoxy-7-chloro-3,7-dimethyloctane, with stirring, keeping the temperature below 130°. When the reaction mixture is homogenous, the reaction is continued 12 hours and then one equivalent of tetraethylenepentamine is added slowly. Then the reaction mixture is heated to reflux until the head temperature is constant. The mixture is then distilled to give crude 1,1-dimethoxy-7-mercapto-3,7-dimethyloctane which is purified by fractional distillation.

EXAMPLE 4

A solution of 10 g. of 1,1-dimethoxy-7-chloro-3,7-dimethyloctane, 1.1 equivalents of sodium hydrosulfide and 100 ml. of methanol is refluxed for 24 hours. After cooling, solvennt is evaporated under reduced pressure and the concentrate taken up in ether. The ether solution is washed with water, dried over magnesium sulfate and then evaporated to give 1,1-dimethoxy-7-mercapto-3,7-dimethyloctane.

EXAMPLE 5

To 5 g. of magnesium covered with dry ether is added a crystal of iodine and then about 10 ml. of a solution of one equivalent of 1,1-dimethoxy-7-chloro-3,7-dimethyloctane in 200 ml. of ether is added. The mixture is stirred until reaction begins and then remainder of solution is added slowly while heating to reflux. After addition is complete, reflux is continued for 1 hour. After cooling to 25°–30°, solid sulfur (one equivalent) is added portionwise while keeping the temperature about 30°–35°. After addition of the surfur is complete, the mixture is stirred for about 1 hour and then cooled to 0°–5° and about 200 ml. of aqueous ammonium chloride added slowly while maintaining low temperature. The organic phase is then separated and extracted with 2N sodium hydroxide. The basic extract is cooled in ice, acidified carefully by addition of cold aqueous HCl and extracted with ether. The ether extract is washed with saturated sodium chloride, dried over magnesium sulfate and evaporated to yield 1,1-dimethoxy-7-mercapto-3,7-dimethyloctane which is purified by distillation.

By use of the above procedure or, alternatively the procedure of Example 2, 3 or 4, each of the hydrochlorides under col. II is converted into the respective mercaptan under col. III.

III 1,1-dimethoxy-7-mercapto-3,7-dimethylnonane
1,1,-dimethoxy-7-mercapto 3-methyl-7-ethylnonane
1,1-dimethoxy-7-mercapto-3-ethyl-7-methylnonane
1,1-dimethoxy-7-mercapto-3,6,7-trimethyloctane
1,1-dimethoxy-6-mercapto-3,6-dimethylheptane
1,1-dimethoxy-6-mercapto-3,5,6-trimethylheptane
1,1-dimethoxy-5-mercapto-2,5-dimethylhexane
1,1-dimethoxy-5-mercapto-2,4,5-trimethylhexane

EXAMPLE 6

To a mixture of 10 g. of 1,1-dimethoxy-7-mercapto-3,7-dimethyloctane, one equiv. of sodium methoxide and 100 ml. of methanol is added 1.5 equivalents of methyl iodide. The mixture is stirred for 2 hours at room temperature and then refluxed for 2 hours. After cooling to room temperature, solvent is removed by evaporation and the residue taken up in ether. The ether solution is washed with water, dried and evaporated under reduced pressure to give 1,1-dimethoxy-7-methylthio-3,7-dimethyloctane which can be purified by chromatography or distillation.

A mixture of 5 g. of 1,1-dimethoxy-7-methylthio-3,7-dimethyloctane, 50 ml. of aqueous tetrahydrofuran (1:1) and 10 ml. of 3N hydrochloric acid is stirred at room temperature until hydrolysis is completed as followed by thin layer chromatography to give crude 7-methylthio-3,7-dimethyloctan-1-al which is worked up by extraction with ether and purified by chromatography.

Following the procedure of this example, there is prepared the methylthio compounds under col. IV from the respective mercaptane under col. III.

IV 7-methylthio-3,7-dimethylnonan-1-al
7-methylthio-3-methyl-7-ethylnonan-1-al
7-methylthio-3-ethyl-7-methylnonan-1-al
7-methylthio-3,6,7-trimethyloctan-1-al
6-methylthio-3,6-dimethylheptan-1-al
6-methylthio-3,5,6-trimethylheptan-1-al
5-methylthio-2,5-dimethylhexan-1-al
5-methylthio-2,4,5-dimethylhexan-1-al

EXAMPLE 7

Sodium methoxide (1.2 g. of sodium and 30 ml. of methanol) is added slowly to a mixture of 6.4 g. of 7-methylthio-3,7-dimethyloctan-1-al and 10 g. of diethyl 3-methoxycarbonyl-2-methyl-prop-2-enyl phosphonate (about 77% trans) in 50 ml. of dimethylformamide, under nitrogen and at about 0°, with stirring. After addition is complete, the reaction is left three hours at room temperature and worked up by extraction with hexane/ether to yield cis/trans methyl 11-methylthio-3,7,11-trimethyldodeca-2,4-dienoate mostly the trans, trans isomer.

By repeating the above process, using each of the aldehydes under col. IV as the starting material, there is prepared the respective methyl ester under col. V.

V methyl 11-methylthio-3,7,11-trimethyltrideca-2,4-dienoate
methyl 11-methylthio-3,7-dimethyl-11-ethyltrideca-2,4-dienoate
methyl 11-methylthio-3,11-dimethyl-7-ethyltrideca-2,4-dienoate
methyl 11-methylthio-3,7,10,11-tetramethyldodeca-2,4-dienoate
methyl 10-methylthio-3,7,10-trimethylundeca-2,4-dienoate
methyl 10-methylthio-3,7,9,10-tetramethylundeca-2,4-dienoate
methyl 9-methylthio-3,6,9-trimethyldeca-2,4-dienoate
methyl 9-methylthio-3,6,8,9-tetramethyldeca-2,4-dienoate

EXAMPLE 8

To 350 ml. of ethanol, 105 ml. of water and 70 ml. of 50% aqueous sodium hydroxide is added 46.5 g. of methyl 11-methylthio-3,7,11-trimethyldodeca-2,4-dienoate. The mixture is refluxed for about 18 hours. After cooling, alcohol is removed in vacuo. Water is added followed by acidification and then extraction with ether to yield 11-methylthio-3,7,11-trimethyldodeca-2,4-dienoic acid.

By use of the above process, the other esters under col. V are hydrolyzed to the respective free acid.

EXAMPLE 9

Sodium ethoxide (9 g. sodium in 600 ml. of ethanol) is added slowly to a mixture of 54.5 g. of 7-methylthio-3,7-dimethyloctan-1-al and 75 g. of diethyl 3-ethoxycarbonyl-2-methylprop-2-enyl phosphonate (about 49% trans) in one liter of dimethylformamide, under nitrogen and at 0°, with stirring. The mixture is allowed to stand overnight at about 5° and the reaction worked up by extraction with ether, washing with water and brine and filtering through Florisil to yield ethyl 1-1-methylthio-3,7,11-trimethyldodeca-2,4-dienoate as a cis/trans mixture, mostly trans, trans.

EXAMPLE 10

To a solution of 0.5 g. of 11-methylthio-3,7,11-trimethyldodeca-2,4-dienoic acid in 15 ml. of benzene is added, with stirring, an equivalent amount of potassium hydride. The mixture is stirred at room temperature for about 2 hours and then evaporated to give potassium 11-methylthio-3,7,11-trimethyldodeca-2,4-dienoate.

In place of KH, there can be used KOH, NaOH, and the like to form the corresponding salt.

EXAMPLE 11

Sodium ethoxide (prepared from 0.2 g of sodium and 12 ml. of ethanol) is slowly added to a mixture of 1.1 g. of 7-methylthio-3,7-dimethyloctan-1-al, diethyl 3-ethoxycarbonyl-2-methyl-prop-2-enyl-phosphonate (1.6 g.) and 50 ml. of dimethylformamide, with stirring, under nitrogen, at 0°. The reaction is stirred for 1.5 hours after addition is complete and then worked up by extraction with ether to yield ethyl 11-methylthio-3,7,11-trimethyldodeca-2,4-dienoate.

EXAMPLE 12

To a mixture of 10 g. of 7-methylthio-3,7-dimethyloctan-1-al, 17 g. of diethyl 3-ethoxycarbonyl-2-methylprop-2-enyl phosphonate (77% trans), and 150 ml. of dimethylformamide, under nitrogen, 0°, with stirring, is added sodium isopropanolate (prepared from 1.5 g. of sodium in 150 ml. of isopropanol). After addition is complete, the reaction is stirred for 18 hours at room temperature and then worked up by extraction with hexane to yield isopropyl 11-methylthio-3,7,11-trimethyldodeca-2,4-dienoate (mostly trans-2,trans-4) which can be chromatographed and distilled for further purification.

EXAMPLE 13

A mixture of 5 g. of 7-mercapto-3,7-dimethyloctan-1-al 8.5 g. of di-isopropyl 3-ethoxycarbonyl-2-methylprop-2-enyl-phosphonate, and 40 ml. of dimethylformamide, under nitrogen and cooled in an ice-bath, is stirred for 0.5 hours and then ground NaOH (1.165g.) is added. The reaction mixture is stirred at room temperature for 3 hours and then hexane/water (1/1) added. The organic layer is washed with water and brine, dried over calcium sulfate and concentrated. The concentrate is filitered through Florisil using hexane and hexane/ether. The filtrate is concentrated and the stilled to yield ethyl 11-mercapto-3,7,11-trimethyl-dodeca-2,4-dienoate (mostly trans-2, trans-4).

The process of this example is repeated with the exception of using di-isopropyl 3-isopropoxy carbonyl-2-methylprop-2-enyl-phosphonate to prepare isopropyl 11-mercapto-3,7,11-trimethyldodeca-2,4-dienoate.

EXAMPLE 14

To 0.55 g. of 11-methylthio-3,7,11-trimethyldodeca-2,4-dienoic acid in 10 ml. of dry benzene is added 0.21 ml. of oxalyl chloride. The mixture is stirred occasionally at room temperature for about 2.5 hours. The mixture is cooled in cold water and then 0.18 ml. of ethylmercaptan is added with stirring. The mixture is then stirred at room temperature for about 24 hours. Ether and saturated sodium bicarbonate is added and the organic phase separated. The organic phase is washed with aqueous sodium bicarbonate, saturated sodium chloride, dried over calcium sulfate and evaporated to yield ethyl 11-methylthio-3,7,11-trimethyl-thioldodeca-2,4-dienoate.

Thiol esters are prepared using each of n-propyl mercaptan isopropyl mercaptan, isobutyl mercaptan, s-butyl mercaptan, n-butyl mercaptan, benzyl mercaptan, cyclopentyl mercaptan β-phenylethyl mercaptan, t-amyl mercaptan and n-hexyl mercaptan in reaction with 11 methylthio-3,7,11-trimethyldodeca-2,4-dienoyl chloride or the sodium salt of 11-methylthio-3,7,11-trimethyldodeca-2,4-dienoic acid to yield n-propyl 11-methylthio-3,7,11-trimethyl-thioldodeca-2,4-dienoate, isopropyl 11-methylthio-3,7,11-trimethyl-thioldodeca-2,4-dienoate, etc.

EXAMPLE 15

By use of the procedure of Example 6, there is prepared
7-ethylthio-3,7-dimethyloctan-1-al,
7-ethylthio-3,7-dimethylnonan-1-al,
7-ethylthio-3-methyl-7-ethylnonan-1-al,
7-ethylthio-3-ethyl-7-methylnonan-1-al,
7-ethylthio-3,6,7-trimethyloctan-1-al,
6-ethylthio-3,6-dimethylheptan-1-al,
6-ethylthio-3,5,6-trimethylheptan-1-al,
5-ethylthio-2,5-dimethylheptan-1-al, and
5-ethylthio-2,4,5-trimethylhexan-1-al using ethyl iodide.

The reaction of 7-ethylthio-3,7-dimethyloctan-1-al with the carbanion of diethyl 3-methoxycarbonyl-2-methylprop-2-enyl-phosphonate according to the procedure of Example 7 gives methyl 11-ethylthio-3,7,11-trimethyldodeca-2,4-dienoate.

EXAMPLE 16

A. Anhydrous methanol (60 ml.) is saturated with dry hydrogen chloride at 0°. To the saturated solution is added 7.8 g. of 3,7-dimethyloct-6-en-1-ol, with stirring, over a period of 5 minutes. After stirring for 15 minutes at 0°, the ice bath is removed and nitrogen bubbled through the solution while it warms to room temperature. Solvent and residual hydrogen chloride are removed by evaporation under reduced pressure to give 7-chloro-3,7-dimethyloctan-1-ol.

B. To an ice-cold solution of 19.0 g. of dry pyridine and 300 ml. of methylene chloride is added 12.0 g. of chromium trioxide under nitrogen. After stirring for 30 minutes at 0°, to the dark brown reaction mixture is added 3.9 g. of 7-chloro-3,7-dimethyloctan-1-ol. The ice bath is then removed and stirring continued for 15 minutes. The solution is then decanted away from the residue and filtered through a 9 cm. by 2 cm. column of Activity IV neutral alumina. Evaporation of the solvent yields 7-chloro-3,7-dimethyloctan-1-al, as a clear, colorless oil.

C. To a mixture of 30 mg. of ammonium chloride, 10 ml. of methanol and one ml. of trimethyl orthoformate is added 500 mg. of 7-chloro-3,7-dimethyloctan-1-al. The reaction mixture is stirred at room temperature overnight under nitrogen. The mixture is then neturalized with sodium methoxide and the methanol removed under reduced pressure. The residue is taken up in ether, washed with sodium bisulfite and then water, dried over calcium sulfate, and solvent removed under reduced pressure to yield the dimethylacetal (1,1-dimethoxy-7-chloro-3,7-dimethyloctane).

By following the procedure of this example, other dimethyl acetal precursors of formula I can be prepared using as the starting material an alcohol of the formula (I″):

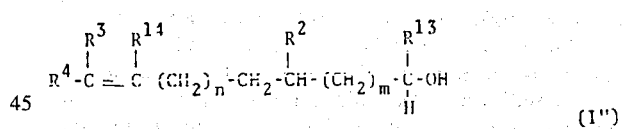

(I″)

The alcohols of formula I″ can be prepared by the reduction of a carbonyl of formula I′ such as the aldehydes thereof (R¹³ is hydrogen) by treatment with sodium borohydride or the like. A representative procedure for reduction of the carbonyl's of formula I′ to the alcohols of formula II″ is as follows: To an ice-cooled solution of 1.0 g. of 3,7-dimethyloct-6-en-1-al in 50 ml. of methanol and 3 ml. of water is added 1.0 g of sodium borohydride. The reaction mixture is stirred and then allowed to stand 3 hours at room temperature. Acetic acid (2 ml.) is added and the mixture concentrated under reduced pressure followed by dilution with water. The diluted concentrate is extracted with ethyl acetate and the extracts combined, washed with water, dried and evaporated to yield 3,7-dimethyloct-6-en-1-ol.

EXAMPLE 17

To a mixture of 20 ml. of benzene, one ml. of ethylene glycol and 10 mg. of p-toluenesulfonic acid is added 500 mg of 7-chloro-3,7-dimethyloctan-1-al. The mixture is refluxed for 16 hours and water is removed by means of a Dean-Stark trap. After cooling to room temperature, the mixture is poured into ether and washed with aqueous sodium bicarbonate and then water. After drying over calcium sulfate, solvent is removed under reduced pressure to yield the ethylene ketal (1,1-cycloethylenedioxy-7-chloro-3,7-dimethyloctane).

The procedure of this example can be used to prepare the other cycloethylene ketals of the carbonyls of formula I.

EXAMPLE 18

A mixture of 4 g. of citronellol (3,7-dimethyloct-6-en-1-ol), 0.490 g. of p-toluenesulfonic acid and 0.290 g. of hydroquinone is placed in a stainless steel screw cap bomb having an internal volume of 45 ml. The bomb is cooled in dry ice. Methyl mercaptan (9 g.) is introduced directly into the bomb through the valve head. The bomb is sealed, left overnight at room temperature and then heated to 220° in an oil bath for about 72 hours. After cooling in dry ice, the bomb valve is opened and the reaction mixture is carefully poured into 5% aqueous sodium hydroxide solution. Ether is added and the organic layer is separated, washed with 5% NaOH, 5% HCl and water, dired over calcium sulfate and concentrated with vacuo to yield 7-methylthio-3,7-dimethyloctan-1-ol.

EXAMPLE 19

Twenty grams of citronellol, 2 g. of p-toluenesulfonic acid and 9 g. of methyl mercaptan are reacted as described in Example 44 except that a temperature of 140° is used instead of 220°, to give 7-methylthio-3,7-dimethyloctan-1-ol.

EXAMPLE 20

To 2.04 g. (10 mmol.) of 7-methylthio-3,7-dimethyloctan-1-ol in 25 ml. of freshly distilled dimethylsulfoxide, under nitrogen at 20°, is added via syringe 11.2 ml. (80 mmol.) of triethylamine while stirring vigorously. Sulfur trioxide-2pyridine complex (10.28 g., 64 mmol.) in dimethylsulfoxide (50 ml.) is added slowly to the mixture via dropping funnel under the same conditions. After addition is complete, the reaction mixture is stirred for 5 minutes and poured into cold water. Hexane is added and the organic layer separated, washed well with water and dried over calcium sulfate. Evaporation of the solvent at reduced pressure affords 7-methylthio-3,7-dimethyloctan-1-al.

EXAMPLE 21

Sodium ethoxide (490 mg.) is added, during about ten minutes and under nitrogen, to a stirred solution of diethyl 3-ethoxycarbonyl-2-methylprop-2-enylphosphonate (1.93 g.) and 7-methylthio-3,7-dimethyloctan-1-al (1.35 g.) in 20 ml. of dimethylformamide, cooled to 0°. The reaction mixture is stirred at room temperature for about 16 hours and then is diluted with water and extracted with ether. The ethereal extracts are washed with brine, dried over calcium sulfate and evaporated to yield ethyl 11-methylthio-3,7,11-trimethyldodeca-2,4-dienoate, predominantly the trans,trans isomer, which can be purified by chromatography or distillation.

EXAMPLE 22

To 5 g. of citronellol in 30 ml. of glacial acetic acid, stirring under nitrogen, is added dropwise 11.26 g. of a 30–32% solution of hydrobromic acid in acetic acid and the mixture is stirred at room temperature for about 18 hours. The reaction mixture is then diluted with water and extracted with pentane. The organic phase is washed with water until neutral, dried over magnesium sulfate and the solvent removed at reduced pressure to give 1-acetoxy-7-bromo-3,7-dimethyloctane.

EXAMPLE 23

Three grams of 1-acetoxy-7-bromo-3,7-dimethyloctane and 20 ml. of 95% aqueous ethanol is stirred under nitrogen for about three hours. Thiourea (760 mg.) is added and the reaction mixture is refluxed under nitrogen for 1 hour. Then 500 mg. of sodium hydroxide in 18 ml. of water is added to the mixture and reflux is continued for 12 more hours. After cooling, the reaction mixture is poured into water and extracted with pentane. The organic extracts are washed with water and brine, dried over magnesium sulfate and concentrated under vacuum to yield 7-mercapto-3,7-dimethyloctan-1-ol, which can be purified by chromatography.

What is claimed is:

1. A compound selected from the following formula:

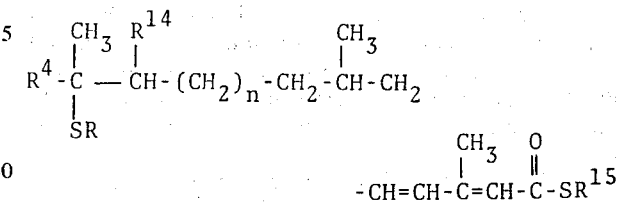

wherein, $n$ is zero or the positive integer one;

R is hydrogen, methyl or ethyl;

$R^4$ is methyl or ethyl;

$R^{14}$ is hydrogen or methyl; and $R^{15}$ is lower alkyl.

2. A compound according to claim 1 wherein R is methyl or ethyl.

3. A compound according to claim 2 wherein n is one and $R^{14}$ is hydrogen.

4. The compound, ethyl 11-methylthio-3,7,11-trimethylthioldodeca-2,4-dienoate, according to claim 1.

5. The compound, n-propyl 11-methylthio-3,7,11-trimethylthioldodeca-2,4-dienoate, according to claim 1.

6. The compound, isopropyl 11-methylthio-3,7,11-trimethylthioldodeca-2,4-dienoate, according to claim 1.

* * * * *